United States Patent

Knowles

[15] 3,683,022
[45] Aug. 8, 1972

[54] N-ACETYL-4-CYCLOALKLOXY-CYCLOHEXYLAMIDES

[72] Inventor: Richard N. Knowles, Hockessin, Del.

[73] Assignee: E. I. du Pont de Nemours and Company, Wilmington, Del.

[22] Filed: April 20, 1967

[21] Appl. No.: 634,417

[52] U.S. Cl................................260/561 R, 424/320
[51] Int. Cl.................................................C07c 103/12
[58] Field of Search............260/561 R; 167/46 A, 47

[56] References Cited

FOREIGN PATENTS OR APPLICATIONS 1,349,559   12/1963   France...................260/561 O Primary Examiner—Leland A. Sebastian
Attorney—Herbert W. Larson

[57] ABSTRACT

N-Acetyl-4-cycloalkyloxycyclohexylamines of the formula:

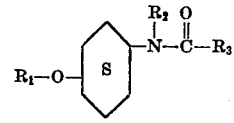

wherein
  $R_1$ is cycloalkyl,
  $R_2$ is hydrogen or alkyl, and
  $R_3$ is hydrogen or alkyl.
Typical is N-acetyl-4-cyclohexyloxycyclohexylamine useful for repelling animals.

8 Claims, No Drawings

N-ACETYL-4-CYCLOALKLOXYCYCLOHEXYLAMIDES

BACKGROUND OF THE INVENTION

The following applications relate to compounds containing cyclohexyl ring structures and having utility as animal repellants:

Application Ser. Nos. 532,544, filed Mar. 1, 1966, now abandoned 574,276, filed Aug. 18, 1966, 574,495, filed Aug. 18, 1966, 574,496, filed Aug. 18, 1966, 574,498, filed Aug. 18, 1966, and 574,499, filed Aug. 18, 1966.

I have now discovered additional classes of compounds containing a cyclohexyl ring structure and having utility as animal repellants.

SUMMARY OF THE INVENTION

I have discovered that animal repellant activity is shown by the following compounds:

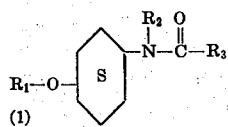
(1)

wherein
$R_1$ is cycloalkyl containing four through nine carbon atoms,
$R_2$ is hydrogen or alkyl containing one through three carbon atoms, and
$R_3$ is hydrogen or alkyl containing one through three carbon atoms.

Substitutions on the cyclohexyl ring must be in the cis configuration to obtain optimum irritant effects.

Preferred because of excellent animal irritant activity at low rates of application are the cis isomers of those compounds of formula (1) wherein $R_1$ is cyclohexyl, and $R_2$ is hydrogen.

Most preferred because of outstanding animal irritant activity at low use rates is the cis isomer of N-acetyl-4-cyclohexyloxycycylohexylamine.

UTILITY

Compounds of this invention cause potent irritation to animal tissue, particularly to the mucous membranes.

Animals exposed to the above compounds show signs of marked respiratory irritation. These compounds have two advantages over currently used animal repellants such as allylisothiocyanate used against dogs, zinc dithiocarbamate-amine complex used against rodents, and bone tar oil used against deer. One, the compounds are more potent at low concentrations and two, provide residual activity over longer periods of time.

Compounds of this invention and particularly the cis isomer of N-acetyl-4-cyclohexyloxycyclohexylamine have potential use as dog repellants, deer repellants, rodent repellants and for contaminating caves or underground tunnels.

PREPARATION

The compounds of this invention can be prepared by the catalytic hydrogenation of 4-alkoxy anilides prepared from the corresponding 4-alkoxyanilines. These reactions are illustrated below. $R_1$, $R_2$ and $R_3$ are the same as defined in formula (1) above.

I
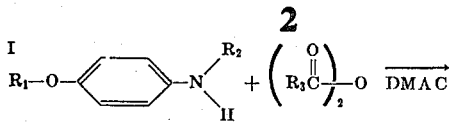

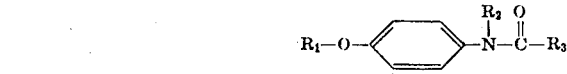

II
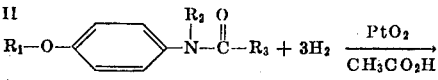

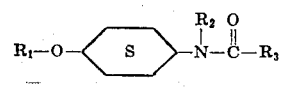

Reaction I is performed by dissolving the desired aniline derivative in one to three times its volume of dimethylacetamide (DMAC) and treating the resulting solution with an excess of the desired acid anhydride. This reaction is exothermic. Therefore, careful mixing and adequate stirring and cooling are required, especially if run in large quantities.

Reaction II is performed by dissolving about 0.15 mole of the anilide in 250 ml. glacial acetic acid. Platinum oxide (2 g.) is added, and the mixture is shaken on a Parr Hydrogenation Apparatus at a hydrogen pressure ranging from 1 to 4 atmospheres. When the required amount of hydrogen is absorbed, the catalyst is filtered, and the filtrate is evaporated in vacuum leaving an oil. This oil is taken up in ether, and washed with dilute sodium bicarbonate solution and then water. The ethereal solution is dried with magnesium sulfate, filtered and evaporated in vacuum leaving an oil. The pure N-acyl-4-alkoxycyclohexylamine is isolated from the oil by chromatography over silicic acid using a 3:1 mixture of chloroform and ethylacetate as eluting solvent. These hydrogenation conditions cause some hydrogenolysis of the ethereal bonds.

COMPOSITIONS

Compounds of this invention can be administered alone, but are generally contained in a composition with an inert diluent non-toxic to animals. The diluent selected depends on the route of administration.

Emulsifying agents can be used with the diluent and compound of formula (1) to aid in dispersion of the active ingredient. Emulsifying agents that could be used include alkylaryl polyethoxyalcohols; alkyl and alkylaryl polyether alcohols, polyoxyethylene sorbitol or sorbitan fatty esters, polyethylene glycol fatty esters, fatty alkylol amide condenstates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations.

The amount of active ingredient in the composition will vary from 0.005 percent by weight to 95 percent or even higher. The diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

APPLICATION

A quantity of active ingredient sufficient to cause irritation to animal tissue is 500 to 10,000 micrograms per liter of air at exposure of 1 minute. It is expected that this rate applies to all animals. Rates of over 20,000 micrograms per liter of air at exposure of 1 minute kill 50 percent of the mice which are treated.

The following additional examples are provided to more particularly explain the invention.

EXAMPLE 1

A stirring solution of 50 grams (0.27 mole) of 4-phenoxyaniline in 200 ml. of dimethylacetamide is treated with 50 ml. of acetic anhydride. The temperature of the solution rises to about 60°C. After having stirred for 15 minutes, the solution is poured into 1,500 ml. of water. The dark crystals which separate are filtered and washed with water. The crystals are recrystallized from benzene; the color is largely removed with activated charcoal during this step. The 4-phenoxyacetanilide (54 grams, 88 percent of theory) melts at 129°C.

The 4-phenoxyacetanilide (35 grams; 0.15 mole) is dissolved in 250 ml. of glacial acetic acid and 2 grams of platinum oxide is added. The mixture is shaken on a Parr Hydrogenation Apparatus at a pressure of 1 to 4 atmospheres until 0.9 moles of hydrogen are absorbed; this requires several days. The catalyst is filtered, and the filtrate is evaporated in vacuum leaving an oil. The residual acetic acid is removed by taking the oil up in ether, and washing it several times with dilute sodium bicarbonate solution. The ethereal solution is then dried with magnesium sulfate, filtered and evaporated in vacuum leaving an oil.

Analysis of this oil by an F & M Model 500 Gas Chromatograph using a 10 percent Carbowax 20M on 60–80 mesh Diatoport T in a 2 ft. × 1/4 in. O.D. stainless steel column at a column temperature of 230°C., a block temperature of 340°C., an injection port temperature of 285°C., and a helium flow rate of 60 cc./min. shows that about 50 percent of this mixture is N-acetylcyclohexylamine and 50 percent cis and trans N-acetyl-4-cyclohexyloxycyclohexylamine.

The desired N-acetyl-4-cyclohexyloxycyclohexylamine (either as a cis/trans mixture or the pure cis and trans isomers) can be isolated by chromatography over silicic acid using a 3:1 mixture of chloroform and ethyl-acetate as eluant. The pure cis isomer melts at 86.0° to 87.5°C., and the pure trans isomer melts at 142.0° to 142.5°C.

Anal. Calculated. for $C_{14}H_{25}NO_2$: C, 70,3; H, 10.5; N, 5.9%.

Found: C, 70.1; H, 10.5; N, 6.2%.

The trans isomer is about half as active an irritant as the cis isomer. This cis/trans mixture can be used as an irritant without separation of the isomers.

Mice are treated by aerosol to this cis/trans mixture of N-acetyl-4-cyclohexyloxycyclohexylamine in the following manner: The compound is administered as an aerosol into a 2.8 liter chamber. The exposure chamber consists of a 2.8 liter bell jar over a nebullizer inserted through the floor of the chamber. Mice are exposed for 5 minutes to 3,000 micrograms per liter (15,000 C t). The compound is dissolved in 1.4 ml. acetone and during a span of 20 seconds the compound is sprayed up into the chamber. No further air is transferred into or out of the chamber during the 5 minute exposure.

After this exposure, irritant effects are observed in all mice exposed, but not in controls exposed to 1.4 ml. of acetone alone. Irritant effects can be described as the presence of one or more of the following reactive signs:

a. abnormal gait,
b. depression,
c. dyspnea,
d. hunched posture, and
e. hypersensitive to touch

EXAMPLES 2–7

The following compounds are made in the manner of N-acetyl-4-cyclohexyloxycyclohexylamine of example 1 by substituting like molar amounts of the appropriate aniline for the 4-phenoxyaniline and acid anhydride for the acetic anhydride of example 1.

2. N-propionyl-4-cyclopentyloxycyclohexylamine.
3. N-butanoyl-4-cyclobutyloxycyclohexylamine.
4. N-acetyl-4-cycloheptyloxycyclohexylamine.
5. N-methyl-N-acetyl-4-cyclobutyloxycyclohexylamine.
6. N-formyl-4-cyclononyloxycyclohexylamine.
7. N-acetyl-4-cyclooctyloxycyclohexylamine.

EXAMPLE 8

A 2 percent solution of N-acetyl-cis-4-cyclohexyloxycyclohexylamine in a 1:1 by volume mixture of ethanol and dichloromethane is dispersed as an aerosol into and through a chamber containing rats weighing about 200 grams.

The aerosol is generated by feeding the solution of test compound through a commercial paint sprayer jet at the rate of 10 ml./min., and dispersing the spray with a stream of air having a flow of 44 l./min. supplied at a pressure of 62 pounds/sq.inch. The efficiency of forming respirable particles ranges from 10 to 40 percent. This aerosol gives a concentration of N-acetyl-cis-4-cyclohexyloxycyclohexylamine in the chamber of 1.5 mg./liter; the mass median diameter of the particles is 1.2 microns with a standard geometric deviation of 1.9. After having been exposed to this aerosol for 1 minute, the rats exhibit lacrimation which lasts for 10 minutes. An examination of the rats 24 hours after the exposure reveals no adverse signs or loss in body weight.

A control run using solvent alone does not produce this effect.

I claim:

1. A compound of the formula:

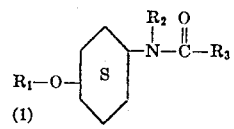

wherein
$R_1$ is cycloalkyl containing four through nine carbon atoms;
$R_2$ is selected from the group consisting of hydrogen and alkyl of one through three carbon atoms;

$R_3$ is selected from the group consisting of hydrogen and alkyl of one through three carbon atoms.

2. A compound according to claim 1 which is N-acetyl-4-cis-cyclohexyloxycyclohexylamine.

3. A compound according to claim 1 which is N-acetyl-4-trans-cyclohexyloxycyclohexylamine.

4. A compound according to claim 1 which is N-formyl-4-cyclohexyloxycyclohexylamine.

5. A compound according to claim 1 which is N-butanoyl-4-cyclohexyloxycyclohexylamine.

6. A compound according to claim 1 which is N-propionyl-4-cyclohexyloxycyclohexylamine.

7. A compound according to claim 1 which is N-acetyl-4-cyclopentyloxycyclohexylamine.

8. A compound according to claim 1 which is N-acetyl-4-cycloheptyloxycyclohexylamine.

* * * * *